US012544678B2

(12) United States Patent
Christensen et al.

(10) Patent No.: US 12,544,678 B2
(45) Date of Patent: Feb. 10, 2026

(54) MODEL VEHICLE ELECTRONIC COOLING SYSTEM AND METHOD

(71) Applicant: TRAXXAS, L.P., McKinney, TX (US)

(72) Inventors: Casey Christen Jens Christensen, McKinney, TX (US); Otto Karl Allmendinger, Rowlett, TX (US); Jory Sprowl, Howe, TX (US); Skylar Hagler, Anna, TX (US); Adam Cole Ewing, McKinney, TX (US)

(73) Assignee: TRAXXAS, L.P., McKinney, TX (US)

( * ) Notice: Subject to any disclaimer, the term of this patent is extended or adjusted under 35 U.S.C. 154(b) by 87 days.

(21) Appl. No.: 18/376,961

(22) Filed: Oct. 5, 2023

(65) Prior Publication Data

US 2024/0115964 A1 Apr. 11, 2024

Related U.S. Application Data

(60) Provisional application No. 63/418,885, filed on Oct. 24, 2022, provisional application No. 63/414,077, filed on Oct. 7, 2022.

(51) Int. Cl.
*A63H 17/26* (2006.01)
*A63H 30/04* (2006.01)
(Continued)

(52) U.S. Cl.
CPC ............. *A63H 17/262* (2013.01); *H02K 5/18* (2013.01); *H02K 9/18* (2013.01); *A63H 30/04* (2013.01)

(58) Field of Classification Search
CPC ...... A63H 17/26; A63H 17/262; A63H 29/22; A63H 30/04; H02K 5/18; H02K 9/18
See application file for complete search history.

(56) References Cited

U.S. PATENT DOCUMENTS 3,628,284 A * 12/1971 Soulakis ................ A63H 17/26 446/462
5,045,013 A * 9/1991 Fujitani .................. A63H 29/10 446/179
(Continued)

FOREIGN PATENT DOCUMENTS

KR 20170111120 A * 10/2017 ............. A63H 17/26

OTHER PUBLICATIONS

Sledge Technology: Aluminum Motor Cradle, Traxxas Webpage [online], [Site visited Jan. 30, 2024], URL: https://traxxas.com/news/sledge-aluminum-motor-cradle (Year: 2024).
(Continued)

*Primary Examiner* — Alexander K Garlen
(74) *Attorney, Agent, or Firm* — Daryl R. Wright; Greg Carr

(57) ABSTRACT

A model vehicle is provided including a model vehicle chassis and a model vehicle body. The model vehicle chassis has an electric motor and cooling fins, thermally coupled to the electric motor. In addition, the model vehicle chassis further has an electric fan directed towards the cooling fins. The model vehicle body has an air vent provided in the model vehicle body. When the model vehicle is operating, airflow enters the air vent and across the cooling fins to dissipate heat generated by the electric motor. Additionally, a rear edge of the model vehicle body is located at a height that is higher than a top of the electric motor and wherein the electric fan increases the airflow across the cooling fins to increase the heat dissipation.

20 Claims, 2 Drawing Sheets

(51) Int. Cl.
*H02K 5/18* (2006.01)
*H02K 9/18* (2006.01)

(56) References Cited

U.S. PATENT DOCUMENTS

| | | | | | |
|---|---|---|---|---|---|
| 5,252,869 | A * | 10/1993 | Gordin | A63H 29/00 | 446/457 |
| 6,971,941 | B2 * | 12/2005 | Kaneko | A63H 17/26 | 446/457 |
| 11,260,312 | B1 * | 3/2022 | Asano | A63H 17/28 | |

OTHER PUBLICATIONS

Traxxas Motor Heat Sink (finned aluminum), Traxxas Webpage [online], [Site visited Jan. 30, 2024], URL: https://traxxas.com/products/parts/3822 (Year: 2024).

* cited by examiner

MODEL VEHICLE ELECTRONIC COOLING SYSTEM AND METHOD

RELATED APPLICATIONS

This application claims the benefit of a related U.S. Provisional Application Ser. No. 63/414,077 filed Oct. 7, 2022, entitled "MODEL VEHICLE ELECTRONIC COOLING SYSTEM AND METHOD," to Casey Christen Jens CHRISTENSEN et al., and related U.S. Provisional Application Ser. No. 63/418,885 filed Oct. 24, 2022, entitled "MODEL VEHICLE ELECTRONIC COOLING SYSTEM AND METHOD," to Casey Christen Jens CHRISTENSEN et al., the contents of both are incorporated by reference herein in their entirety.

BACKGROUND

The following descriptions and examples are not admitted to be prior art by virtue of their inclusion in this section.

Radio-Controlled or RC model vehicles are a popular hobby for a growing segment of the population. In the case of electrically powered vehicles, as the electronics become more sophisticated and the batteries more advanced, the ease of operation and the run time of RC model vehicles have increased dramatically. In addition, ever more powerful brushless electric motors have enabled higher and higher speeds of RC model vehicles. However, increased RC model vehicle speed usually means increased RC model vehicle motor heat generation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an exemplary embodiment, a model vehicle is provided comprising a model vehicle chassis and a model vehicle body. The model vehicle chassis further comprises an electric motor, cooling fins, thermally coupled to the electric motor. The model vehicle body further comprises an air vent provided in the model vehicle body. Wherein when the model vehicle is operating, airflow enters the air vent and across the cooling fins to dissipate heat generated by the electric motor.

In accordance with another exemplary embodiment, a model vehicle is provided comprising a model vehicle chassis and a model vehicle body. The model vehicle chassis further comprises an electric motor and cooling fins, thermally coupled to the electric motor along with an electric fan directed towards the cooling fins. The model vehicle body further comprises an air vent provided in the model vehicle body and a grille provided across an opening defined by the air vent. Wherein when the model vehicle is operating, airflow enters the air vent and across the cooling fins to dissipate heat generated by the electric motor. In addition, wherein the electric fan increases the airflow across the cooling fins to increase the heat dissipation.

In accordance with yet another exemplary embodiment, a model vehicle is provided comprising a model vehicle chassis and a model vehicle body. The model vehicle chassis further comprises an electric motor and cooling fins, thermally coupled to the electric motor. In addition, the model vehicle chassis further comprises an electric fan directed towards the cooling fins. The model vehicle body further comprises an air vent provided in the model vehicle body. Wherein when the model vehicle is operating, airflow enters the air vent and across the cooling fins to dissipate heat generated by the electric motor. Additionally, wherein a rear edge of the model vehicle body is located at a height that is higher than a top of the electric motor and wherein the electric fan increases the airflow across the cooling fins to increase the heat dissipation.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

In the following specification, numerous specific details are set forth to provide a thorough understanding of embodiments of the present disclosure. However, those skilled in the art will appreciate that the embodiments may be practiced without such specific details. In other instances, well-known elements have been illustrated in schematic or block diagram form in order not to obscure embodiments of the present disclosure in unnecessary detail.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

Radio Controlled (RC) model vehicles usually comprise a scale version of a model vehicle body coupled to a model vehicle chassis. The model vehicle chassis contains the electronics, batteries, and servos required for operating an RC model vehicle. In the case of electrically powered vehicles, as the electronics become more sophisticated and the batteries more advanced, the ease of operation and the run time of RC model vehicles have increased dramatically. In addition, ever more powerful brushless electric motors have enabled higher and higher speeds of succeeding model vehicles. With increased model vehicle speed comes increased generation of heat.

Most model vehicles use a thin shelled model vehicle body without external openings. This type of model vehicle body along with a model vehicle chassis can trap the generated heat in the space between an interior wall of the model vehicle body and the model vehicle chassis. In severe cases, such as running a vehicle on a hot day in a competitive environment, this heat can damage the computer electronics.

Effectively dissipating or reducing the amount of trapped heat can prolong the life of the electronics, including the motor and the computer circuits.

Figure 1:
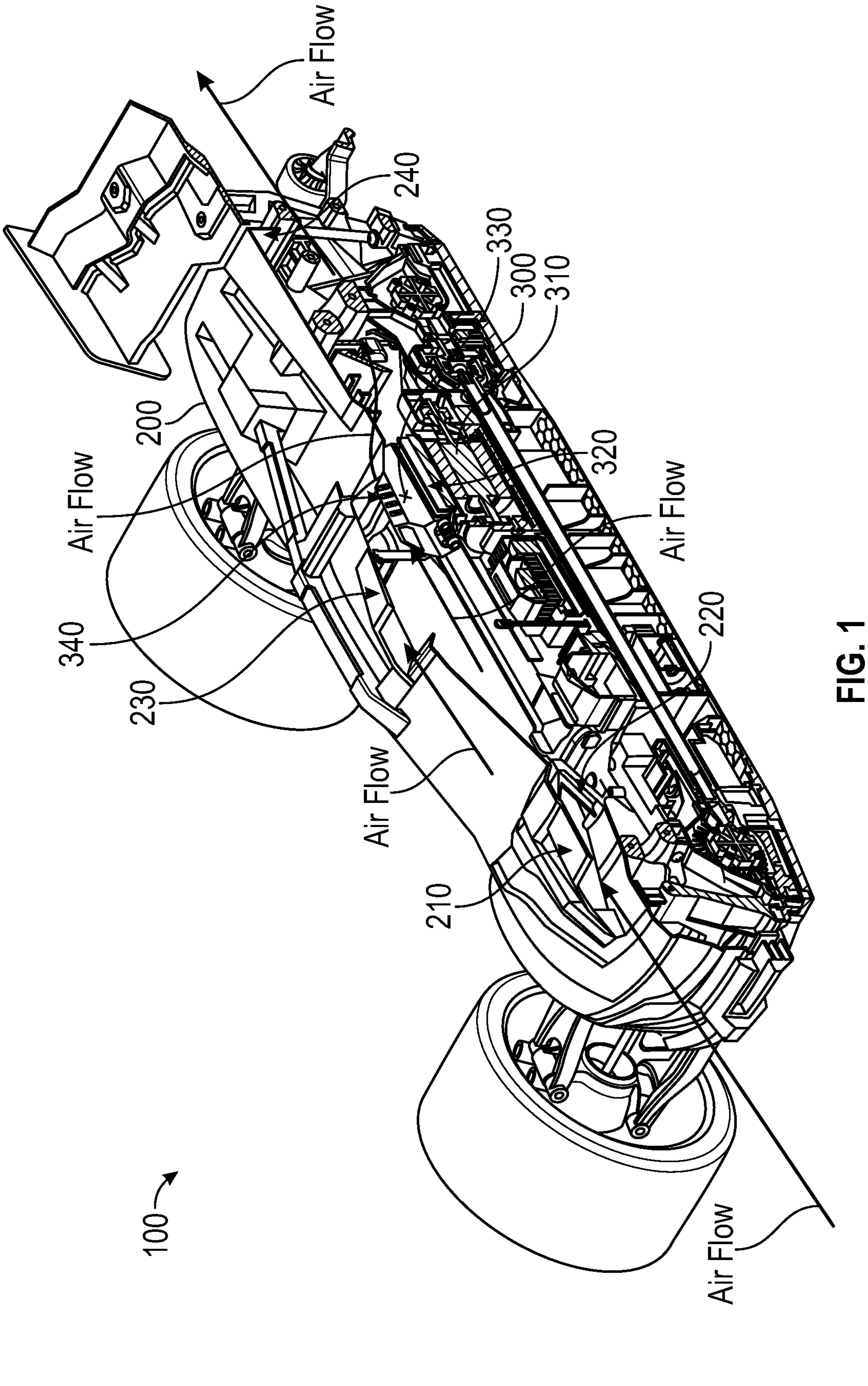
FIG. 1 is an elevated perspective cutaway view of a body on a model vehicle chassis, in accordance to an embodiment of the current disclosure.
Figure 2:
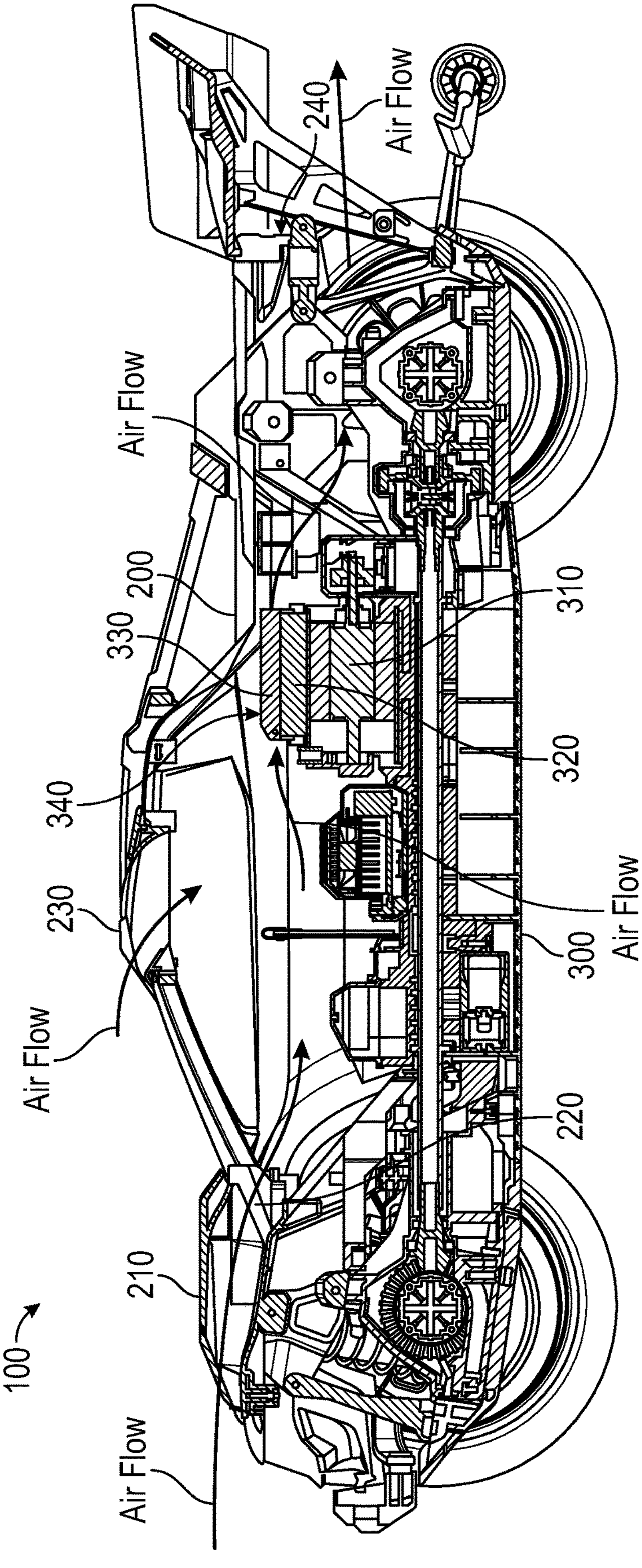
FIG. 2 is an elevated side cutaway view of the body on a model vehicle chassis of FIG. 1, in accordance with an embodiment of the current disclosure.

Referring generally to FIGS. 1 and 2, these drawings show an exemplary embodiment of a model vehicle 100 according to the current disclosure. As shown, the model vehicle 100 comprises a model vehicle body 200 and a model vehicle chassis. The model vehicle body 200 further comprises a first air vent 210 and a second air vent 230. Of course, a person of skill in the art would recognize that a single air vent may be used, or that more than two air vents may be used and still fall within the scope of this disclosure.

In this exemplary embodiment, the front of the model vehicle body 200 is solid, shaped to represent an off-road racing vehicle. In other embodiments, the front may be open in an area that would typically occupy a grill on a full-sized vehicle. This opening may be used as an air vent. In still other embodiments, openings on the side of the model vehicle body may be used as air vents either by themselves or along with other air vents.

One advantage of having an air vent 220, or 230 located on the hood or roof of the model vehicle body is the potential reduction in the amount of contaminates entering into the interior provided between the model vehicle body and the model vehicle chassis. In some exemplary embodiments, the model vehicle body may be sealed against the model vehicle chassis to inhibit water from entering into the interior.

In this embodiment, the first air vent provided on the hood of the model vehicle body has a grille 220 formed as a grating across the opening into the interior. The grating comprises straight slats or bars restricting or inhibiting foreign objects, such as rocks, branches, leaves, etc., from entering into the interior. Although straight slats are shown in this example, mesh, lattice, or other shapes may be used to inhibit entry of larger items (as opposed to dirt, water, and other contaminants for example) into the first air vent 210 while still allowing the relatively free flow of air.

While both the first air vent 210 and the second air vent 230 are shown as having relatively minor intrusions into the interior of the model vehicle 100, other embodiments (not shown) may include ducting or other means to more actively direct the air where it will provide the greatest benefit. One example of this is the use of the first and second air vents 210, 230 to allow entry into the interior of the model vehicle 100, while configuring the model vehicle body 200 to have a raised rear edge 240 enabling the exit of air from the interior.

The use of a large opening in the rear of the model vehicle body 200 created by having a raised rear edge 240, reduces the buildup of pressure inside the model vehicle 100, allowing a greater volume of air to flow into, through and out of the interior of the model vehicle 100.

The model vehicle chassis 300 may comprise various electronic equipment such as ESC's (Electronic Speed Controls), radio receivers, batteries, BEC's (Battery Eliminator Circuits), servos, etc., and an electric motor 310. High speed operation can cause the electric motor 310 to generate a significant amount of heat, potentially damaging the other electronic equipment located proximate to the electric motor 310.

In order to dissipate some of the heat generated by the electric motor 310, cooling fins 320 (most easily seen in FIG. 1) may contact the outer portion of the electric motor 310. The cooling fins 320 may be made of a highly thermally conductive material such as aluminum, for example. Contacting the outer portion of the electric motor 310 with the cooling fins 320 thermally couples the electric motor 310 to the cooling fins 330. Thermally coupling the two components together facilitates the transfer of heat from the outer portion of the electric motor 310 to the various individual fins of the cooling fins 320.

The various fins of the cooling fins 320 increases the surface area available for heat to transfer into the surrounding air. As the model vehicle 100 is operated, air enters into the one or more air vents 210, 230, passes through the interior of the model vehicle body 200, and flows pass the cooling fins 320, allowing heat transfer into the air from the various fins of the cooling fins 320, before exiting through the rear of the model vehicle body 200 due to the raise rear edge 240. Increasing speed of the model vehicle 100 should proportionally increase the air flow, resulting in higher amounts of heat transfer to help offset the increased amount of heat generated by the electric motor 310.

Of course, when the model vehicle 100 is standing still, only trace amounts of air flow through the model vehicle body 200 due to outside wind speed. To assists in the heat dissipation of the cooling fins 320 during times that the model vehicle 100 is stationary, one or more electric fans 330 may be provided within a fan housing 340 that is affixed and directed to move air passed the various fins of the cooling fins 320, thereby facilitating heat transfer to the air and out of the rear of the model vehicle body 200.

As shown in FIG. 1, a single electric fan 330 (obscured by a fan housing 340), is provided for a set of cooling fins 320 on a right-side portion of the electric motor 310. Since this is a sectional view of half of the model vehicle 100, a second electric fan 330, fan housing 340, and cooling fins 320 may be provided on the left-side of the electric motor 310 in the half not shown. Of course, more than 2 sets of electric fans 330, fan housings, and cooling fins 320 may be provided in another embodiment or a single set of cooling fins 320 for two sets of electric fans 330 and fan housings 340 may be provided in another embodiment, among others, according to thermal requirements.

In still other cases, the fan housings 340 may be configured to direct air flow to the electric fans 330 and increase the efficiency and effectiveness of the electric fans 330 (see Air Flow directional arrows in figures). The fan housing 340 may also increase the air speed across the cooling fins 320, increasing the thermal effectiveness of heat dissipation over the various individual fins.

Although only a few example embodiments have been described in detail above, those skilled in the art will readily appreciate that a wide range of variations, modifications, changes, and substitutions are contemplated in the foregoing disclosure and, in some instances, some features of the present disclosure may be employed without a corresponding use of the other features.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

It is the express intention of the applicant not to invoke 35 U.S.C. § 112, paragraph 6 for any limitations of any of the claims herein, except for those in which the claim expressly uses the words 'means for' together with an associated function.

What is claimed is:

1. A model vehicle comprising:
a model vehicle chassis comprising:
an electric motor;
cooling fins, thermally coupled to the electric motor;
an electric fan directed towards the cooling fins:
a model vehicle body, further comprising:
an air vent provided in the model vehicle body;
wherein when the model vehicle is operating, airflow enters the air vent and across the cooling fins to dissipate heat generated by the electric motor; and
wherein the electric fan increases the airflow across the cooling fins to increase heat transfer by the cooling fins.

2. The model vehicle according to claim 1, wherein the air vent is provided on a hood of the model vehicle body.

3. The model vehicle according to claim 1, wherein the air vent is provided on a roof of the model vehicle body.

4. The model vehicle according to claim 1, wherein the air vent is provided on a side of the model vehicle body.

5. The model vehicle according to claim 2, further comprising a second air vent on a roof of a model vehicle.

6. The model vehicle according to claim 1, wherein the air vent further comprises a grille across an opening defined by the air vent.

7. The model vehicle according to claim 1, further comprising a fan housing enclosing the electric fan and increasing the airflow through the electric fan.

8. The model vehicle according to claim 1, further comprising:
a second electric fan directed towards the second cooling fins;
wherein the second electric fan increases the airflow across the cooling fins to increase heat transfer by the cooling fins to the airflow from the electric motor.

9. A model vehicle comprising:
a model vehicle chassis comprising:
an electric motor;
cooling fins, thermally coupled to the electric motor;
an electric fan directed towards the cooling fins;
a model vehicle body, further comprising:
an air vent provided in the model vehicle body;
a grille provided across an opening defined by the air vent;
wherein when the model vehicle is operating, airflow enters the air vent and across the cooling fins to dissipate heat generated by the electric motor; and
wherein the electric fan increases the airflow across the cooling fins to increase the heat dissipation.

10. The model vehicle according to claim 9, further comprising a second electric fan directed towards the cooling fins.

11. The model vehicle according to claim 9, further comprising a second air vent provided in a roof of the model vehicle body.

12. The model vehicle according to claim 9, wherein the rear edge of the model vehicle body is located at a height that is higher than a top of the electric motor.

13. The model vehicle according to claim 9, further comprising a fan housing enclosing the electric fan and increasing the airflow to the cooling fins.

14. A model vehicle comprising:
a model vehicle chassis comprising:
an electric motor;
cooling fins, thermally coupled to the electric motor;
an electric fan directed towards the cooling fins;
a fan housing enclosing the electric fan and increasing the airflow through the electric fan;
a model vehicle body, further comprising:
an air vent provided in the model vehicle body;
wherein when the model vehicle is operating, airflow enters the air vent and across the cooling fins to dissipate heat generated by the electric motor; and
wherein the electric fan increases the airflow across the cooling fins to increase the heat dissipation.

15. The model vehicle according to claim 14, further comprising a grille provided across an opening defined by the air vent.

16. The model vehicle according to claim 14 further comprising a second air vent located in a roof of the model vehicle body.

17. The model vehicle according to claim 14 further comprising a second electric fan directed towards the cooling fins.

18. The model vehicle according to claim 16 wherein the air vent is located in the hood of the model vehicle body.

19. The model vehicle according to claim 14 further comprising a grille provided across an opening defined by the air vent.

20. The model vehicle according to claim 14 wherein a rear edge of the model vehicle body is located at a height that is higher than a top of the electric motor.

* * * * *